(12) United States Patent
Roelkens et al.

(10) Patent No.: US 8,676,003 B2
(45) Date of Patent: *Mar. 18, 2014

(54) METHODS AND SYSTEMS FOR REDUCING POLARIZATION DEPENDENT LOSS

(75) Inventors: Günther Roelkens, Schellebelle (BE); Diedrick Vermeulen, St. Pauwels (BE)

(73) Assignees: Universiteit Gent, Ghent (BE); IMEC, Leuven (BE)

( * ) Notice: Subject to any disclaimer, the term of this patent is extended or adjusted under 35 U.S.C. 154(b) by 118 days.

This patent is subject to a terminal disclaimer.

(21) Appl. No.: 13/504,503

(22) PCT Filed: Oct. 27, 2010

(86) PCT No.: PCT/EP2010/066289
§ 371 (c)(1),
(2), (4) Date: Apr. 27, 2012

(87) PCT Pub. No.: WO2011/051358
PCT Pub. Date: May 5, 2011

(65) Prior Publication Data
US 2012/0207428 A1    Aug. 16, 2012

Related U.S. Application Data

(60) Provisional application No. 61/255,622, filed on Oct. 28, 2009.

(51) Int. Cl.
*G02B 6/00*    (2006.01)
(52) U.S. Cl.
USPC .......................................... 385/14

(58) Field of Classification Search
USPC ........ 385/14, 15, 16, 37, 147, 28; 372/19, 26, 372/27, 50, 96; 356/307
See application file for complete search history.

(56) References Cited

U.S. PATENT DOCUMENTS

| | | | |
|---|---|---|---|
| 6,393,172 B1 * | 5/2002 | Brinkman et al. | 385/16 |
| 6,424,763 B1 * | 7/2002 | Villeneuve et al. | 385/27 |
| 6,879,441 B1 * | 4/2005 | Mossberg | 359/569 |
| 7,065,272 B2 * | 6/2006 | Taillaert et al. | 385/37 |
| 7,356,224 B2 * | 4/2008 | Levner et al. | 385/37 |
| 7,693,370 B2 * | 4/2010 | Levner et al. | 385/37 |
| 8,311,377 B2 * | 11/2012 | Levner et al. | 385/37 |
| 2004/0165808 A1 | 8/2004 | Lauzon | |
| 2008/0031566 A1 | 2/2008 | Matsubara et al. | |
| 2009/0180729 A1 | 7/2009 | Rasras | |
| 2011/0008001 A1 * | 1/2011 | Doerr | 385/37 |

OTHER PUBLICATIONS

International Search Report for PCT/EP2010/066289, Feb. 1, 2011.

(Continued)

*Primary Examiner* — Akm Enayet Ullah
(74) *Attorney, Agent, or Firm* — Bacon & Thomas, PLLC

(57) ABSTRACT

A photonics integrated circuit for processing radiation includes a first-dimensional grating coupler for coupling in radiation, a second two-dimensional grating coupler for coupling out radiation and a waveguide structure having two distinct waveguide arms for splitting radiation received from the first grating coupler and recombining radiation in the second grating coupler. A phase shifting means furthermore is provided for inducing an additional phase shift in at least one of the two distinct waveguide arms thereby inducing a relative phase shift of π between the two distinct waveguide arms so as to provide a TE/TM polarization switch for radiation between the first grating coupler and the second grating coupler.

13 Claims, 10 Drawing Sheets

(56) References Cited

OTHER PUBLICATIONS

Schonbrun, E. et al., "Polarization beam splitter based on a photonic crystal heterostructure", Optics Letters, Optical Society of America, Washington DC, Nov. 1, 2006, vol. 31, No. 21, pp. 3104-3106.

Bogaerts, W. et al., "A Compact Polarization-Independent Wavelength Duplexer Using a Polarization-Diversity SOI Photonic Wire Circuit", Optical Fiber Communication Conference and Exposition National Fiber Optics Engineers Conference (OFCNFOEC 2007), Mar. 1, 2007, pp. 1-3.

Halir R. et al., "Reducing Polarization-Dependent Loss of Silicon-on-Insulator Fiber to Chip Grating Couplers", IEEE Photonics Technology Letters, Mar. 15, 2010, vol. 22, No. 6, pp. 389-391.

* cited by examiner

| WL(nm) | 1542.5 | 1547.0 | 1551.5 | 1556.0 | 1560.5 | 1565.0 |
|---|---|---|---|---|---|---|
| PDL (dB) ON | 0.8 | 0.4 | 0.4 | 0.35 | 0.6 | 1 |
| PDL (dB) OFF | 1.25 | 1.1 | 1.2 | 1.4 | 2.0 | 2.2 |

TABLE 1

METHODS AND SYSTEMS FOR REDUCING POLARIZATION DEPENDENT LOSS

CROSS REFERENCE TO RELATED APPLICATION

Benefit is claimed under 35 USC 119(e) of U.S. provisional application No. 61/255,622 filed Oct. 28, 2009, which is fully incorporated herein by reference.

FIELD OF THE INVENTION

This invention relates to integrated optical components and methods of operating the same. More specifically it relates to photonics integrated circuits using a two dimensional, polarization splitting, grating coupler having low or no polarization dependent loss and of methods using such systems.

BACKGROUND OF THE INVENTION

Photonic integrated circuits hold the potential of creating low cost, compact optical functions. The application fields in which they can be applied are very diverse: telecommunication and data communication applications, sensing, signal processing, etc. These optical circuits comprise different optical elements such as light sources, optical modulators, spatial switches, optical filters, photodetectors, etc., the optical elements being interconnected by optical waveguides. Silicon photonics is emerging as one of the most promising technologies for low cost integrated circuits for optical communication systems. It is CMOS-compatible and due to the available high refractive index contrast, it is possible to create very compact devices.

However, coupling of light between an optical element such as for example an optical fiber and an optical waveguide, e.g. an optical waveguide on a silicon chip, is challenging because of the large mismatch in mode-size between the integrated nanophotonic waveguides (typically 0.1 µm$^2$) and standard single mode fibers (typically 100 µm$^2$). This may lead to high coupling losses, for example in the order of 20 dB. Therefore, there is a great interest in improving the coupling efficiency between an optical waveguide circuit and an optical fiber or more in general for improving the coupling efficiency between an integrated optical waveguide and an optical element (e.g. light source, modulator, optical amplifier, photodetector) or between an integrated optical waveguide and free space.

Different technologies are presented in the literature to enhance the coupling efficiency between an integrated optical waveguide and an optical fiber. One possible solution is a lateral coupler using spot size conversion with an inverse taper, in combination with a tapered or lensed optical fiber. Although this technique allows broadband and polarization independent coupling, the 1 dB alignment tolerances are very small (typically about 0.3 µm). Moreover, this approach requires cleaved and polished facets to couple light into the optical circuit. This excludes its use for wafer-scale optical testing of the optical functions, and may lead to a high cost.

In order to improve the coupling efficiency to a standard single mode fiber in a high refractive index contrast system, and in order to relax the alignment accuracy of an optical fiber and to allow for wafer scale testing, one-dimensional grating structures have been proposed. These structures allow direct physical abutment from the top or bottom side of the optical waveguide circuit with a standard single mode optical fiber, while the diffraction grating directs the light into the optical waveguide circuit (or vice versa). The performance of these one-dimensional gratings is critically dependent on the polarization of the light. Typically, only a single polarization at a certain wavelength can be efficiently coupled between the integrated optical waveguide and an optical fiber, resulting in a very polarization dependent operation of the one-dimensional grating coupler. As in typical applications this polarization is unknown and varying over time, the applicability of the one-dimensional grating structures may be limited. In cases where a polarization maintaining fiber is used or where a polarization scrambling approach is adopted, these one-dimensional gratings can be used. Also in the case where the one-dimensional grating structure is used to optically couple an integrated light source, generating, processing or detecting light with a known and fixed polarization, these devices can be used.

In order to be able to handle situations where polarization is unknown and varying over time, a two-dimensional grating coupler structure has been proposed (U.S. Pat. No. 7,065,272), which comprises two optical waveguides intersecting at a substantially right angle and a two-dimensional diffractive grating structure created at the intersection. When the diffractive grating is physically abutted with a single mode optical fiber, a polarization split is obtained that couples orthogonal modes from the single-mode optical fiber into identical modes in the first and second waveguide. While the ratio of coupled optical power between both optical waveguides is still dependent on the polarization of the incident light, this two-dimensional fiber coupling structure can be used in a polarization diversity approach, in order to achieve a polarization independent integrated circuit, i.e. an integrated circuit wherein the processing of the radiation is performed independent of the polarization of the incoming radiation.

SUMMARY OF THE INVENTION

It is an object of the present invention to provide good photonic integrated circuits using two-dimensional grating couplers having low, reduced or no polarization dependent loss. It is an advantage of embodiments according to the present invention that polarization dependent loss (PDL) inherently induced by two dimensional (2D) grating couplers can be low, reduced or avoided.

It is an advantage of certain embodiments of the present invention to provide a combination of a phase shifting device and/or attenuator in combination with one or more 2-dimensional polarization splitting (and equivalently combining) grating couplers. By controlling the phase between the two polarizations and the relative power, one can generate any possible polarization in the fiber and thus obtain a polarization controlling device. Equivalently one can design a polarization detector by measuring the relative power and phase shift between the two split polarizations.

It is an advantage of certain embodiments the present invention to use a phase shifter in combination with two 2-dimensional polarization splitting grating couplers in order to reduce the polarization dependent loss (PDL) and thereby obtaining complete polarization diversity.

It is an advantage of embodiments according to the present invention that a relative phase shift of $\pi$ in one of the waveguide arms of a polarisation diversity circuit can be used for having an effectively low polarization dependent loss (0.15 dB PDL is obtained). It is an advantage of at least some embodiments of the present invention that the low PDL can be obtained for a relatively large bandwidth.

Embodiments of the present invention may comprise a phase shifter and attenuator in combination with a two dimensional (2D), polarization splitting, grating coupler to effectively control the polarization of the light coupling integrated circuit, detect incoming polarization states and reduce polarization dependent loss in photonics integrated circuits.

The present invention relates to a photonics integrated circuit may comprise a first two-dimensional grating coupler for coupling in radiation, a second two-dimensional grating coupler for coupling out radiation and a waveguide structure comprising two distinct waveguide arms for splitting radiation received from the first grating coupler and recombining radiation in the second grating coupler, wherein a phase shifting means is provided for inducing an additional phase shift in at least one of the two distinct waveguide arms thereby inducing a relative phase shift of $\pi$ between the two distinct waveguide arms so as to provide a TE/TM polarization switch for radiation between the first grating coupler and the second grating coupler. It is an advantage of embodiments of the present invention that polarization dependent loss due to use of a two-dimensional grating coupler can be low, reduced or avoided. The TE/TM polarization switch may also be referred to as a polarization interchange, i.e. the original TE mode becomes TM and the original TM mode becomes TE. The two-dimensional grating coupler may be adapted for coupling at least part of the radiation of both TE and TM polarization into each of the waveguide arms. It is an advantage of embodiments of the present invention that a polarization diversity circuit can be obtained.

The phase shifting means may be a phase shifting means introduced in one of the two distinct waveguide arms, the phase shifting means inducing a phase shift $\pi$. It is an advantage of embodiments of the present invention that the phase shifting means can easily be introduced.

The phase shifting means may be any or a combination of an integrated heater, an electro-optical device or an added fixed waveguide portion. It is an advantage of embodiments of the present invention that low PDL sensitivity can be obtained by implementation of a single component. It is an advantage of some embodiments of the present invention that an integration of a PDL reduction unit can be implemented without adding an extra complex component.

The first grating coupler may couple radiation from an optical fiber to the waveguide structure. It is an advantage of embodiments of the present invention that inherent PDL loss due to the grating coupler can be compensated for.

The second grating coupler may couple between the waveguide structure and an optical fiber. It is an advantage of embodiments of the present invention that PDL due to a grating coupling to a fiber can be reduced.

The first grating coupler and the second grating coupler may be substantially equal.

It is an advantage of embodiments of the present invention that PDL due to a grating coupling between integrated optical waveguides can be reduced.

The optical circuit may comprise a silicon on insulator material. It is an advantage of embodiments of the present invention that small integrated circuits that reduce PDL due to grating coupling can be constructed. The optical circuit may be a III-V material system. The optical circuit may be a low index contrast material system. The first and second two dimensional grating may be a metal grating.

The photonics integrated circuit may comprise an attenuator in at least one of the waveguide arms. It is an advantage of embodiments of the present invention that both PDL caused by misalignment of the fibers and by the anti-reflection tilting of the fibers can be reduced.

The optical circuit may comprise a demultiplexer for splitting the radiation in at least one waveguide arm into different wavelength beams. It is an advantage of embodiments of the present invention that a multiplexed signal can be demultiplexed while still obtaining a small PDL.

The phase shifting means may be positioned downstream the demultiplexer. It is an advantage of embodiments of the present invention that a multiplexed signal can be demultiplexed with a PDL reduction specifically suited for every signal wavelength.

The present invention relates to a method for coupling radiation, the method comprising receiving radiation on a first two-dimensional grating, splitting said received radiation into two distinct waveguide arms and recombining the radiation from the waveguide arms in the second grating coupler for coupling the radiation out, the method comprising inducing an additional phase shift in at least one of the two distinct waveguide arms thereby inducing a relative phase shift of $\pi$ between the two distinct waveguide arms so as to provide a TE/TM polarization switch for radiation between the first grating coupler and the second grating coupler.

The subject matter regarded as invention is particularly pointed out and distinctively claimed in the claim section concluding this document. The invention however, both as to organization and method of operation, together with features and advantages thereof, may best be understood by reference to the following detailed description when read with the accompanying drawings.

Figure 1:
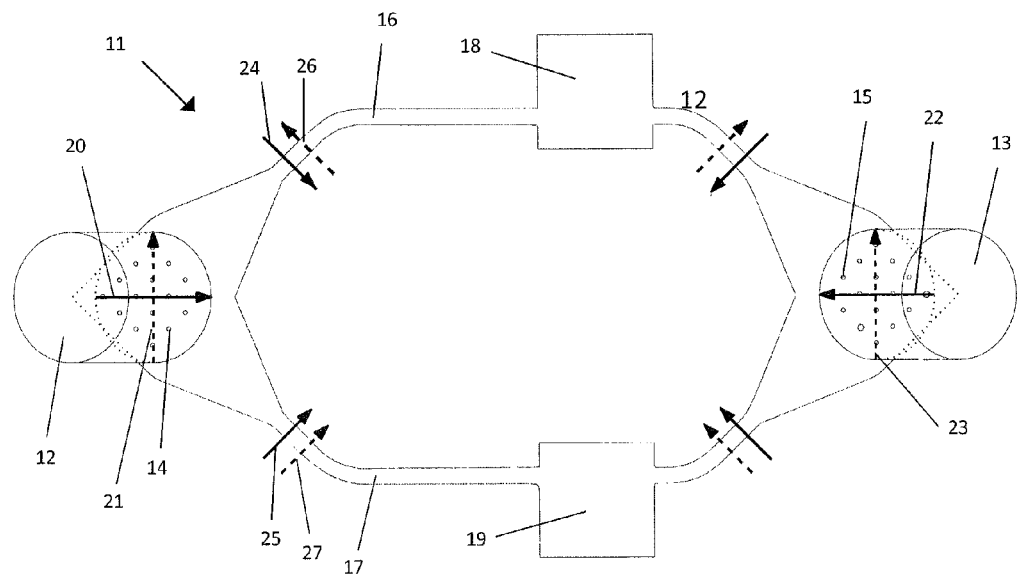
FIG. 1 illustrates a schematic illustration of a polarization diversity circuit with 2D gratings, as known from prior art.

Table 1 is the measured PDL at transmission peaks with heaters on and off. Waveguide heater power ~20 mW, ring heater power ~4 mW.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the context of the present invention, the terms "radiation" and "light" are used for indicating electromagnetic radiation with a wavelength in a suitable range, i.e. electromagnetic radiation with a wavelength that is not absorbed by the materials used (e.g. the waveguide material), for example electromagnetic radiation with a wavelength between 1 µm and 2 µm, e.g. near infrared radiation (NIR) or short wavelength infrared radiation (SWIR).

In the context of the present invention, a grating is an optical device comprising a pattern of grooves, channels or cavities or holes. If the pattern is in one direction only, the grating is called a linear or a one-dimensional grating. If the pattern is in two directions, e.g. two orthogonal directions, it is referred to as a two-dimensional grating. Embodiments of the present invention relate to two-dimensional gratings, i.e. 2D gratings. The filling factor or duty cycle of a grating is the ratio between the area covered by the part of the grating in between the grooves or holes and the area covered by the grooves or holes. A grating can be periodic (uniform) or non-periodic (non-uniform). In case of a periodic grating the size of the grooves or holes is substantially equal and the distance between the grooves or holes is substantially equal. The period of the grating is then defined as the interval between adjacent grooves or holes. A two-dimensional grating thus has a double periodicity.

The coupling efficiency between an optical element, e.g. optical fiber, and an integrated optical waveguide is defined as the fraction of the light that is coupled from the optical fiber into the waveguide. By reciprocity, this is also the fraction of light that can be coupled from the waveguide into the optical fiber.

The Polarization Dependent Loss (PDL) is a measure of the peak-to-peak difference in transmission of an optical component or system with respect to all possible states of polarization. It is the ratio of the maximum and the minimum transmission of an optical device with respect to all polarization states.

Where the term coupling of a wavelength or radiation of a certain wavelength is used, this refers to coupling of light of that wavelength but may also include coupling of a wavelength band around a predetermined wavelength.

Where the term high refractive contrast is used, reference may be made to systems wherein the difference in refractive index, e.g. between a cladding material and a core material, is larger than one refractive index unit. Where reference is made to low refractive index materials, reference may be made to material systems wherein the difference in refractive index, e.g. between a cladding material and a core material, is limited to less than 1, e.g. to one or a few tenths of a refractive index unit.

Transverse electric (TE) polarized light is linearly polarized light with its electric field oriented parallel to the plane of integrated optical waveguide and normal to its wave vector. Transverse magnetic (TM) polarized light is linearly polarized light with its magnetic field oriented parallel to the plane of integrated optical waveguide and normal to its wave vector.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Certain embodiments of methods and the devices of the present invention are described in more detail below for silicon on insulator (SOI) material system. However, the present invention is not limited thereto. The methods and devices of the present invention can also be used with other material systems, such as for example III-V material systems (e.g. InGaAs/InP, AlGaAs/GaAs) or low index contrast material systems, or with metal gratings.

Certain embodiments of methods and devices of the present invention are described in more detail below for coupling of light between an integrated optical waveguide and an optical fiber. However, the invention is not limited thereto and can be used for coupling light between an integrated optical waveguide and an optical element such as a light source or a light detector or for coupling light between an integrated optical waveguide and free space or between two optical integrated waveguides (e.g. in a multilayer circuit).

Certain embodiments of methods and devices of the present invention are described in more detail below for controlling a phase shift of the light with an integrated heater and thus using the thermo-optical effect. However, the invention is not limited thereto and phase shifters which use an electro-optical effect can also be used. Also, a mechanical push or pull at the waveguide can introduce a phase shift. One can also use a fixed phase shift by adding a fixed waveguide length difference or in general make the circuit asymmetrical. Embodiments of the present invention relate to photonics integrated circuits. Silicon-on-insulator photonic wire technology allows for a substantial scaling in the size of photonic integrated circuits due to the high refractive index contrast that is available. Silicon waveguides with dimensions on the order of 500 nm by 200 nm allow for single mode propagation and tight optical confinement. The high refractive index contrast makes the waveguide structures very polarization dependent however, which is an issue in many practical applications like telecommunication applications wherein low Polarization Dependent Loss (PDL) operation is mandatory. Therefore polarization diversity schemes are being proposed to tackle this problem. However, when using two-dimensional grating couplers for near vertical fiber input and output, the low PDL bandwidth is limited. In one approach, a polarization splitter and rotator is being integrated on the chip, such that the two arms of the polarization diversity circuit are processing the same polarization state. This results in relatively low PDL (about 1 dB). An alternative approach is based on the use a two-dimensional grating structure, which at the same time fulfills the role of optical fiber interface, polarization splitter and rotator, all on a 100 µm$^2$ area. Taking into account the full bandwidth of the grating coupler spectrum, still quite substantial polarization dependent loss can be observed in the experiment (1 to 2 dB PDL in the fiber to fiber coupling 1 dB bandwidth). The existence of polarization dependent loss (PDL) in photonic integrated circuits making use of two-dimensional (2D) grating structures has different sources and can be understood as follows.

In a polarization diversity scheme like the one shown in FIG. 1, which are improved by embodiments of the present invention, light is coupled in and out of the circuit 11 with fibers 12 and 13 positioned over the two dimensional grating couplers 14 and 15. These couplers convert any polarization state in the fiber to TE polarized light in both arms 16 and 17 of the polarization diversity circuit 11. In order to avoid strong back reflections from the gratings 14 and 15, the fibers 12 and 13 have to be slightly tilted, typically at ~10° with respect to the vertical. In both arms 16 and 17 the light is then directed to the integrated photonic device 18 or 19 that performs the desired functionality and is finally coupled into the output fiber 13 using an identical 2D grating coupler 15. In such a polarization diversity configuration there are three main sources of PDL.

Figure 2:
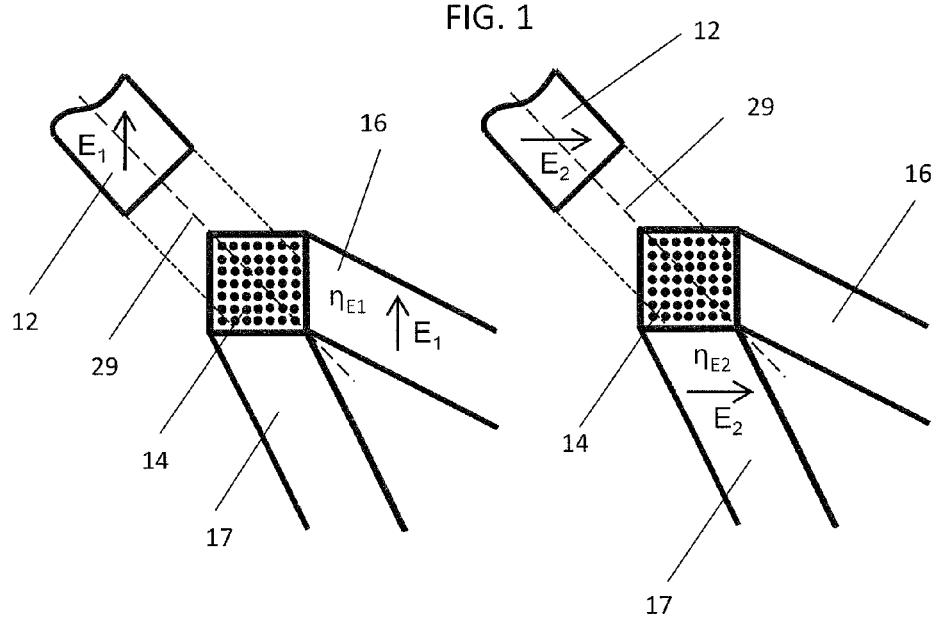
FIG. 2 shows a schematic representation of a 2-dimensional grating coupler as known from prior art, wherein the optical fiber is perfectly aligned along the symmetry axis of the grating.
Figure 3:
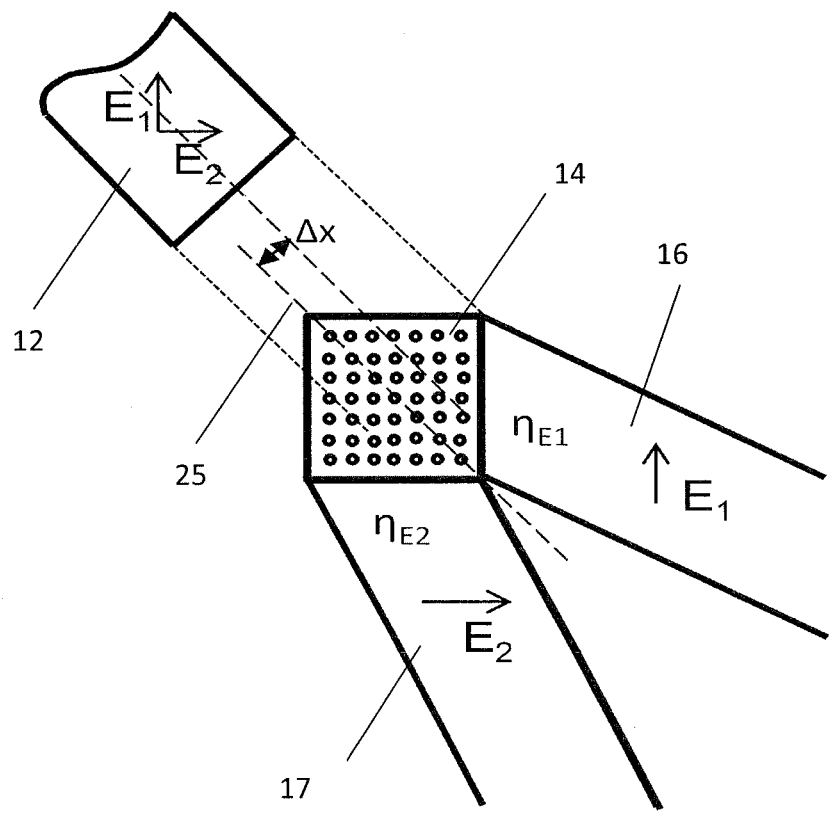
FIG. 3 shows a schematic representation of a 2-dimensional grating coupler as known from prior art, wherein the optical fiber is not aligned at the symmetry axis of the grating, but with an offset of $\Delta x$.

First, if the input and output fibers 12 and 13 are not positioned along the diagonal of the 2D grating couplers 14 and 15, symmetry is lost and some polarization states will couple more efficiently to and from the integrated waveguides than others, see FIGS. 2 and 3. This contribution to PDL can be minimized in first place with proper fiber alignment. In the other case, where the fiber is misaligned, the PDL can be reduced by using attenuators 56. Such solutions can in addition also be implemented in embodiments of the present invention, as will be shown in FIG. 7, FIG. 8 and FIG. 9. The effect of misalignment is illustrated using FIG. 2 and FIG. 3. FIG. 2 shows a schematic representation of a 2-dimensional grating coupler 14 coupled to a fiber 12 and two waveguide arms 16 and 17. The optical fiber 12 is perfectly aligned along the symmetry axis 29 of the grating 14. At the left hand side of the drawing respectively the right hand side of the drawing, the coupling of a polarization with the electrical field $E_1$ respectively $E_2$ along one of the grating periods is shown. Due to the properties of the grating such a polarization will propagate entirely into one arm. The coupling efficiency $\eta_{E1}$ of the polarization $E_1$ is the same as the coupling efficiency $\eta_{E2}$ of the polarization $E_2$ and thus the coupling efficiency is the same for both orthogonal polarizations. FIG. 3 shows a schematic representation of a 2-dimensional grating coupler 14 coupled to a fiber 12 and two waveguide arms 16 and 17. The optical fiber 12 is not aligned at the symmetry axis 29 of the grating 14, but with an offset of $\Delta x$. The coupling of a polarization with the electrical field $E_1$ or $E_2$ along one of the grating periods is shown. The coupling efficiency $\eta_{E2}$ for the polarization $E_2$ is higher than coupling efficiency $\eta_{E1}$ for the polarization $E_1$. The coupling efficiency $\eta$ thus is the higher for one of the polarizations. Also the fiber misalignment introduces a phase difference for the light in the waveguide.

Second, due to fluctuations during fabrication the devices in either arm 16 and 17 may not behave identically, thus introducing a different amount of loss. Trimming or tuning of the devices may be used to cancel this effect. In some device configurations the same device can be used for both arms of the polarization diversity circuit, by propagation in opposite directions.

Figure 4:
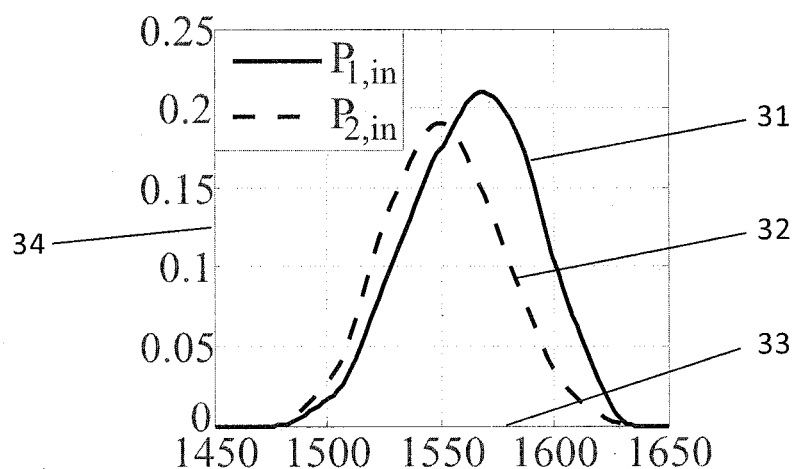
FIG. 4 shows the simulated coupling efficiency of a 2D grating for the orthogonal polarizations $P_{1,in}$ and $P_{2,in}$ aligned along the grating bisection lines, which can be taken into account using embodiments of the present invention.

Finally, the grating couplers themselves also introduce PDL. This is best understood considering the two linear polarizations at 0 and $\pi/2$, $P_{1,in}$ and $P_{2,in}$, shown in FIG. 1 respectively as polarizations 20 and 21. Due to the near vertical coupling, $P_{1,in}$ is slightly tilted out of the grating plane, while $P_{2,in}$ lies in the same plane as the grating coupler 14. Consequently $P_{1,in}$ and $P_{2,in}$ will not exhibit the same coupling efficiency. The different coupling efficiencies are shown in FIG. 4 wherein the horizontal axis 33 represents the wavelength in mm and the vertical axis 34 represents the coupling efficiency in relative units. The exemplary coupling efficiency curves 31 and 32 shown were obtained with 3D Finite Difference Time Domain simulations of a 19×19 array of circular holes with a diameter of 400 nm and a 605 nm pitch etched 70 nm deep into the 220 nm thick silicon waveguide layer, which is the structure used in the example used for illustrating the polarization diversity circuit embodiment of the present invention. The outgoing waveguides form an 83.8° angle to account for the effect of the tilted fiber. Since the coupling efficiency of both polarizations only coincides at a specific wavelength, the grating coupler will generally introduce PDL. The reduction of this type of PDL is the main contribution and will be reduced by embodiments of the invention. Embodiments of the present invention can in addition thereto, also compensate for PDL introduced due to misalignment of fibres.

From symmetry considerations it is clear that if polarization state $P_{1,in}$ is aligned along the grating bisection line, it will couple symmetrically to the upper arm 16 and lower arm 17 of the polarization diversity circuit 11. This is schematically illustrated with the solid arrows 24 and 25 on the left side of FIG. 1. On the other hand, polarization state $P_{2,in}$ will couple anti-symmetrically, i.e. with a $\pi$ phase shift between the upper arm 16 and the lower arm 17, as shown with the dashed arrows 26 and 27. If the optical signals in both arms experience the same phase shift when propagating through the photonic integrated device, the output grating 15 will restore the original input polarization state. That means that when light with either polarization $P_{1,in}$ or $P^{2,in}$ is coupled in, represented as arrow 20 respectively 21, it will experience the same coupling efficiency curve 31 or 32 twice when coupled out as polarization 22 respectively 23, thus increasing PDL.

In a first aspect, the present invention relates to a photonics integrated circuit for processing radiation. Such a photonics integrated circuit comprises a first two-dimensional grating coupler for coupling in radiation, a second two-dimensional grating coupler for coupling out radiation and a waveguide structure comprising two distinct waveguide arms for splitting radiation received from the first grating coupler and recombining radiation in the second grating coupler, wherein a phase shifting means is provided for inducing an additional phase shift in at least one of the two distinct waveguide arms thereby inducing a relative phase shift of $\pi$ between the two distinct waveguide arms so as to provide a TE/TM polarization switch for radiation between the first grating coupler and the second grating coupler. In embodiments of the present invention, the two-dimensional grating coupler may be any suitable two-dimensional grating coupler allowing coupling, e.g. comprising an at least two dimensional pattern of holes or grooves. The two-dimensional grating coupler advantageously is adapted for coupling at least part of the radiation of both TE and TM polarization into each of the waveguide arms. The phase shifting means for inducing an additional phase shift may be a single phase shifter provided in one of the distinct waveguide arms or may be a set of phase shifters arranged so that the relative phase shift of $\pi$ between the two distinct waveguide arms is induced. Examples of phase shifters may be a heating and/or cooling means, a portion of an optical waveguide for adjusting the optical path length, etc. It has been demonstrated that embodiments of the present invention result in a low PDL, e.g. 0.15 dB PDL was measured, for a significant bandwidth. For example, the PDL may be smaller than 1 dB over a 20 nm broad wavelengthband. In one aspect, the phase shifting means may be made of a set of phase shifting means, the ensemble resulting in a relative phase shift of $\pi$ between the two distinct waveguide arms. For example in one embodiment, part of the phaseshift, e.g. a largest part or a part being nearly $\pi$, can be introduced using an additional piece of waveguide, and the remaining part, e.g. small part of the faseshift, may be obtained using a heater. As such a heater is controllable, the phaseshift obtained also can be controllable and can be adjusted to the wavelength. As the heater only needs to do part of the phase shift, less power will be needed than for the case the heater needs to provide for the full phaseshift.

Figure 5:
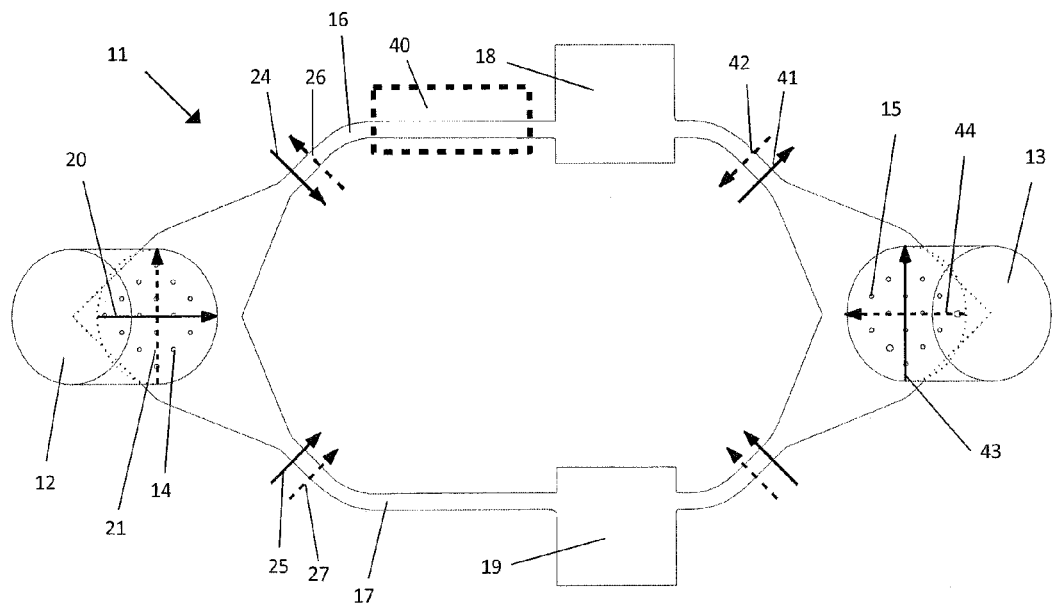
FIG. 5 illustrates a photonic integrated circuit comprising a phase shifting means according to an embodiment of the present invention, causing a relative shift $\pi$ between the waveguide portions.
Figure 6:
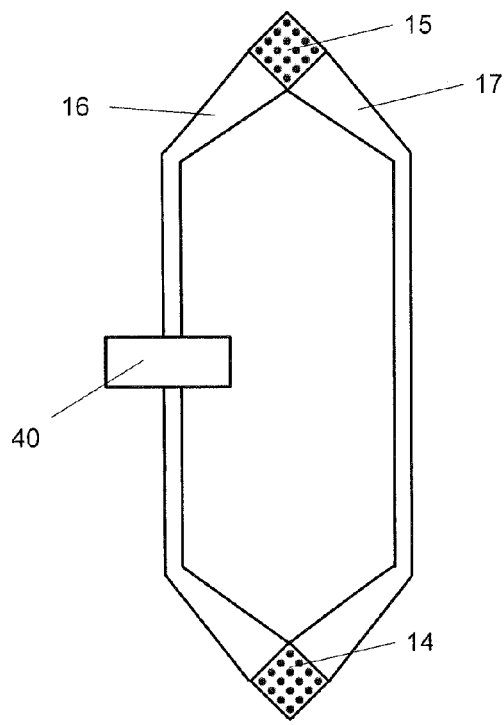
FIG. 6 is an alternative representation of a polarization diversity circuit where a phase shifter is used to reduce the PDL, according to an embodiment of the present invention.

By way of illustration, embodiments of the present invention not being limited thereto, an exemplary photonics integrated circuit according to the present invention will further be discussed, describing standard and optional features of embodiments of the present invention. In the exemplary system shown in FIG. 5 a photonic integrated circuit is shown comprising a two-dimensional grating adapted for receiving a radiation beam. The radiation beam can be considered as radiation comprising two linear polarizations at 0 and $\pi/2$, $P_{1,in}$ and $P_{2,in}$, shown in FIG. 2 respectively as polarizations 20 and 21. Due to the near vertical coupling, $P_{1,in}$ is slightly tilted out of the grating plane, while $P_{2,in}$ lies in the same plane as the grating coupler 14. Consequently $P_{1,in}$ and $P_{2,in}$ will not exhibit the same coupling efficiency. Features of the positioning of an external fiber may be as indicated for FIG. 1. Radiation is coupled in and out of the circuit 11 with fibers 12 and 13 positioned over the two dimensional grating couplers 14 and 15. These couplers convert any polarization state in the fiber to TE polarized light in both arms 16 and 17 of the polarization diversity circuit 11. In order to avoid strong back reflections from the gratings 14 and 15, the fibers 12 and 13 have to be slightly tilted, typically at about 10° with respect to the vertical. In both arms 16 and 17 the radiation is then directed to the integrated photonic processor 18 or 19 that performs the desired functionality and is finally coupled into the output fiber 13 using an identical 2D grating coupler 15. According to embodiments of the present invention, a phase shifting means for introducing a phase shift $\pi$ between the waveguide arms is present, e.g. a $\pi$ phase shifter 40 is introduced in one of the arms 16 of the polarization diversity circuit 11. In the present example, this will cause the polarizations represented by arrows 24 and 26 to change with a phase shift π as illustrated by arrows 41 and 42. This will cause the polarization states $P_{1,in}$ and $P_{2,in}$ represented by arrows 20 and 21 respectively to interchange their orientation to polarizations 43 and 44 respectively at the output grating coupler 15. More generally, the polarization states of radiation at the first grating interchanges with respect to the polarization states of radiation at the second grating. In other words, e.g. TE and TM mode at the first grating becomes TM and TE mode respectively. Consequently, either of these states will experience both coupling efficiency curves 31 and 32 (one at the input, and the other one at the output), so that the overall input to output coupling is identical for both, and PDL is low, reduces or even vanishes. Another representation of the integrated circuit 11 is shown in FIG. 6 with the input coupling grating 14, the output coupling grating 15, the two waveguide arms 16 and 17 and the π phase shifter 40.

Embodiments of the present invention also can be provided with further components, such as for example attenuators for compensating misalignment of fibers, integrated power taps, photodetectors to monitor the incoming polairsation state, components of the integrated optical processor, . . . .

Figure 7:
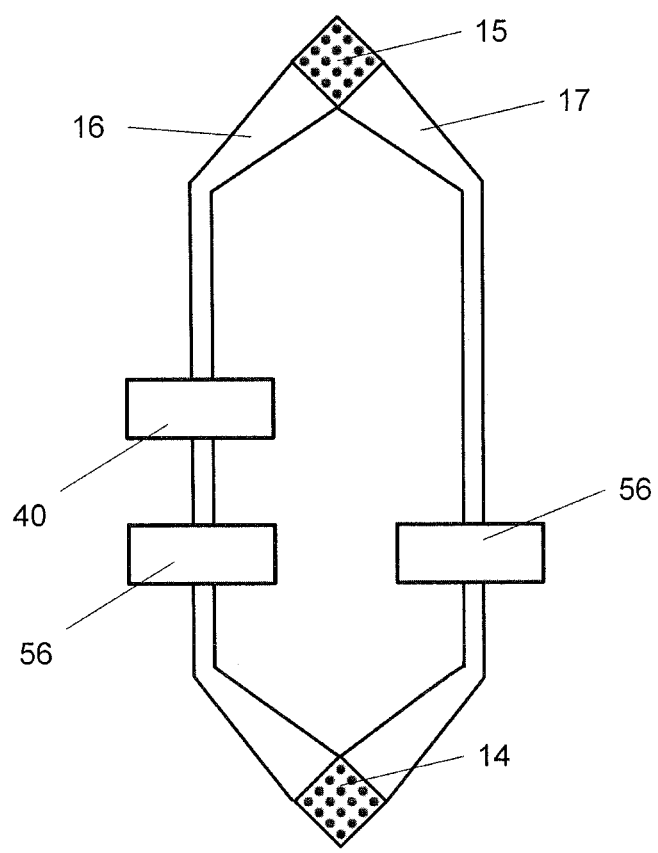
FIG. 7 shows a polarization diversity circuit where a phase shifter and attenuators are used to reduce the PDL en compensate for fiber misalignment, according to an embodiment of the present invention.
Figure 8:
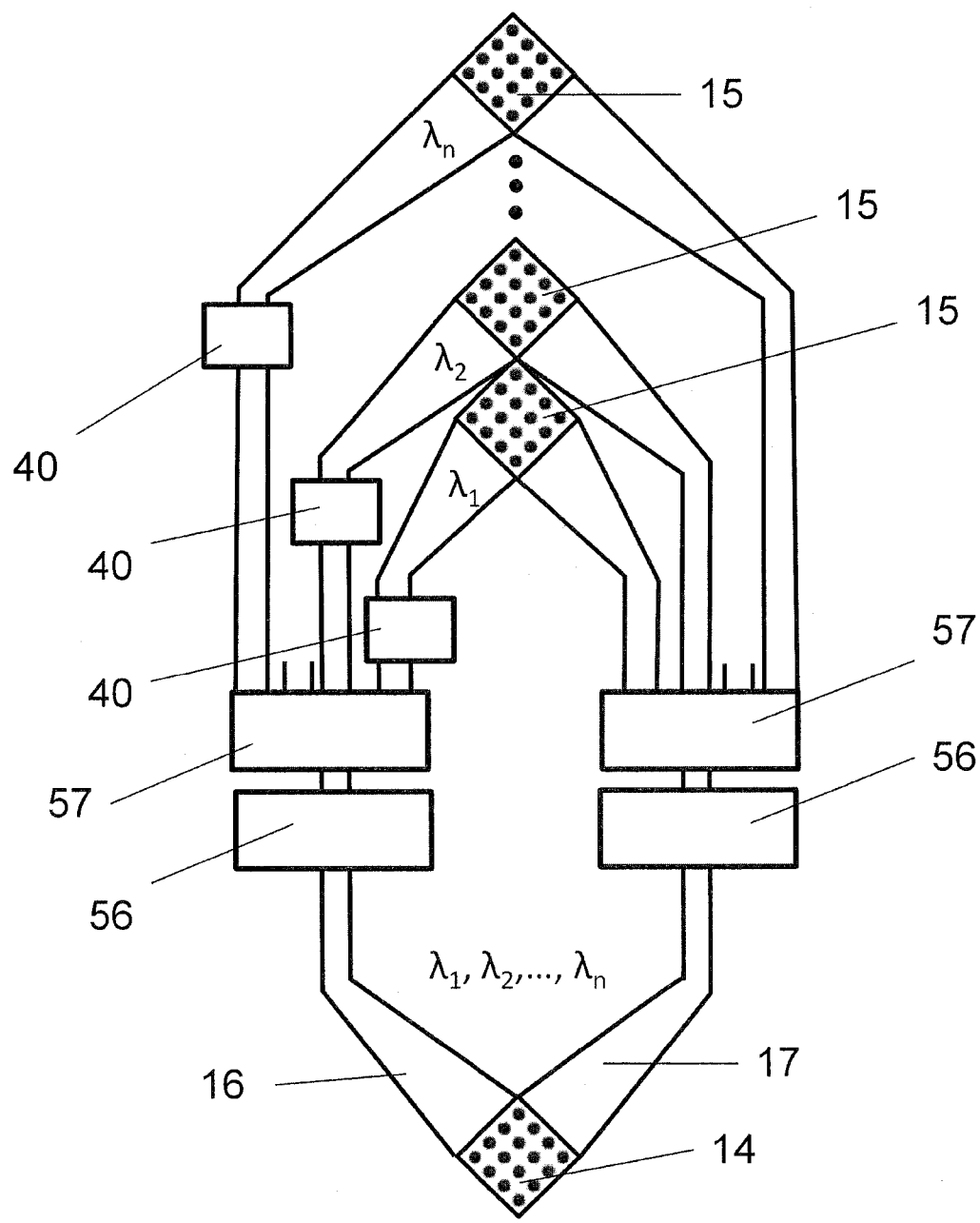
FIG. 8 shows a polarization diversity demultiplexing circuit where phase shifters and attenuators are used to reduce the PDL, wherein the phase shift is introduced behind the demultiplexer, according to an embodiment of the present invention.
Figure 9:
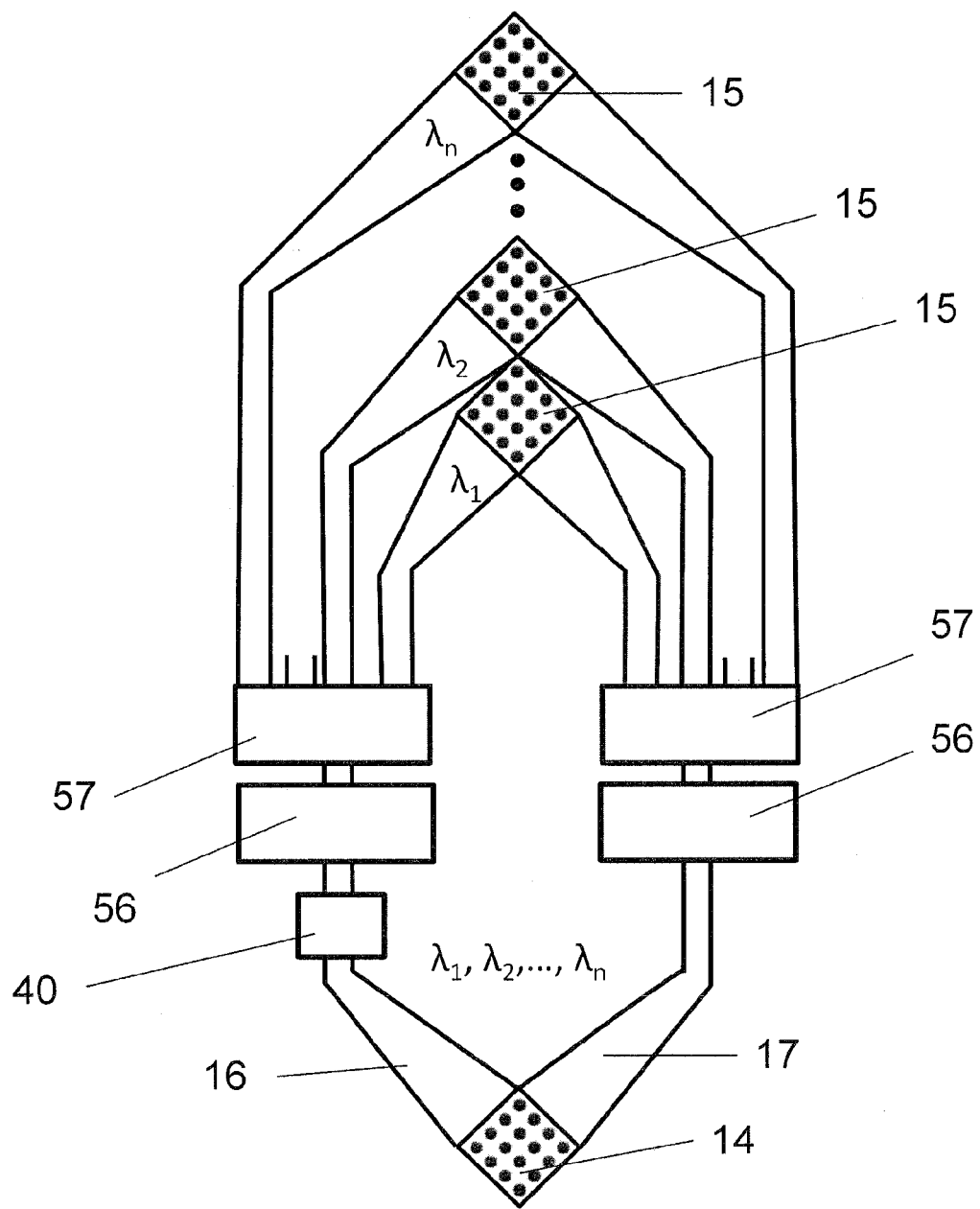
FIG. 9 shows a polarization diversity demultiplexing circuit where phase shifters and attenuators are used to reduce the PDL, wherein the phase shift is introduced before demultiplexing, according to an embodiment of the present invention.

By way of illustration, a system comprising attenuators 56 for compensating misalignment of fibers with respect to the two-dimensional grating is shown in FIG. 7. The circuit can also be used as a fiber-to-fiber polarization rotator. Alternatively or in addition thereto an additional photonics integrated processor may be present for processing the radiation. In another exemplary embodiment, a system for use with a multi-wavelength signal is described. The system, shown in FIG. 8 illustrates a system wherein a radiation beam comprising radiation of a plurality of wavelengths $\lambda_1$ to $\lambda_n$ can be processed separately. A two-dimensional grating 14 is used for coupling in and attenuation may be performed using an attenuator 56 for compensating for misalignment. After demultiplexing using e.g. a demultiplexer 57, a phase shifter 40 is inserted in one set of arms to induce an appropriate phase shift for each wavelength, after which every wavelength $\lambda_1$ to $\lambda_n$ is coupled out with gratings 15. An alternative embodiment is shown in FIG. 9, wherein the phase shifter 40 is implemented before the demultiplexer 57.

Figure 10:
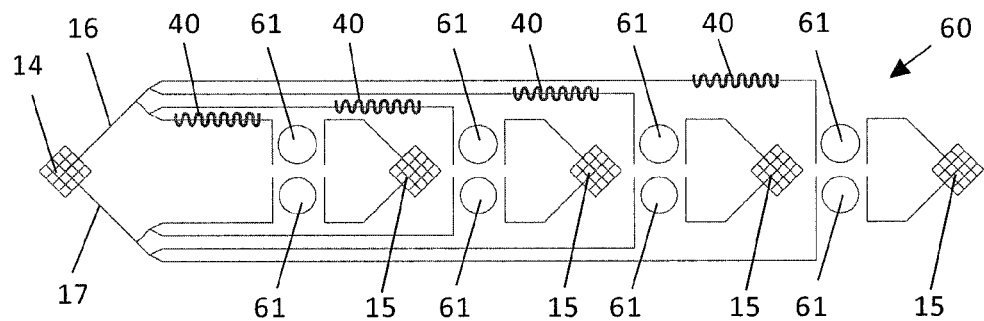
FIG. 10 shows a schematic representation of a wavelength router, making use of embodiments according to the present invention.
Figure 11:
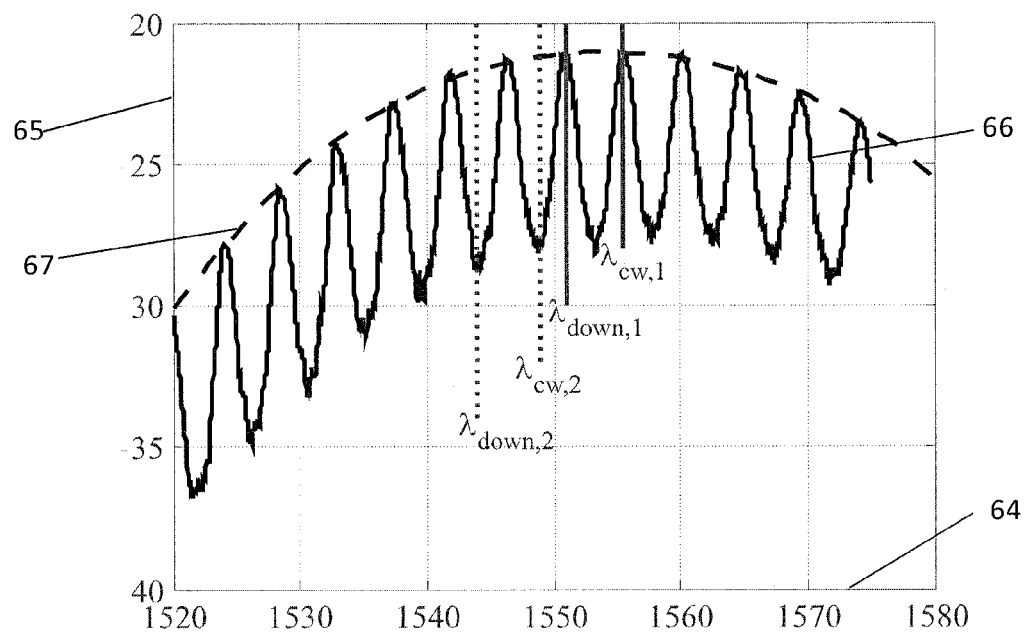
FIG. 11 shows a measured spectral response of a wavelength router as shown in FIG. 10, wherein the dashed envelope indicates the overall efficiency of the two 2D grating couplers.
Figure 12:
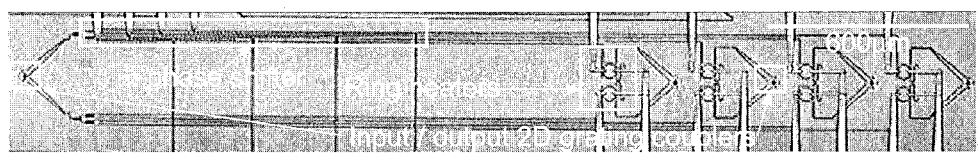
FIG. 12 shows a microscope image of a wavelength router comprising waveguide heaters (phase shifters) and ring heaters, according to an embodiment of the present invention.

Another exemplary embodiment illustrates a polarization diversity circuit being a tunable wavelength router. By way of illustration, embodiments of the present invention not being limited thereto, FIG. 10 illustrates a photonics integrated circuit whereby the photonic processors 18 and 19 are ring resonators in combination with heaters to allow for wavelength tuning as well as matching the devices in both waveguide arms. The final purpose of the circuit 60 is to act as tunable wavelength router for Fiber to the Home applications. As such, in this prototype it has to deliver two wavelengths to the home user, one with the downstream data ($\lambda_{down,1,2}$) and a continuous wave ($\lambda_{cw,1,2}$) that can be modulated at the user end. Both of these wavelengths must be routed with low PDL. Furthermore, wave lengths intended for other users should be suppressed, but PDL is less critical at these wavelengths. The component operates with the downstream data and continuous wave wavelengths at two consecutive transmission peaks of the ring resonators 61, while wavelengths of other users are located at transmission minima. The recorded transmission spectrum is plotted in FIG. 11. In this graph the losses 65 in dB are plotted with respect to the wavelength 64. The solid curve 66 is the measured spectral response of the wavelength router 60. The dashed envelope 67 indicates the overall efficiency of the 2D grating couplers. An insertion loss of 21 dB is obtained, which is due to the limited efficiency of the grating couplers 14 and 15 (approximately 7 dB loss per coupler) and the 1×4 splitter implemented in the circuit. The efficiency of the grating couplers can be improved however by using a silicon overlay. This, however, does not change the concept of PDL reduction. The free spectral range of the rings is ~4.5 nm, while their extinction ratio needs further optimization for use in a practical circuit. Fabrication of the device as shown in FIG. 11 was on a SOI wafer with a silicon thickness of 220 nm using deep UV lithography and a two etch depth process. A 70 nm etch depth is used for the grating couplers 14 and 15, whereas the photonic wires 16 and 17 are completely etched. After cladding the device with DVS-BCB, titanium heaters are defined on top of the ring resonators 61 to allow for wavelength tuning as well as matching the devices in both arms. The π phase shifter 40 in the present example also was implemented with a heater on top of one of the arms of the polarization diversity circuit. A microscope image of a wavelength router capable of addressing four users is shown in FIG. 12.

Figure 15:
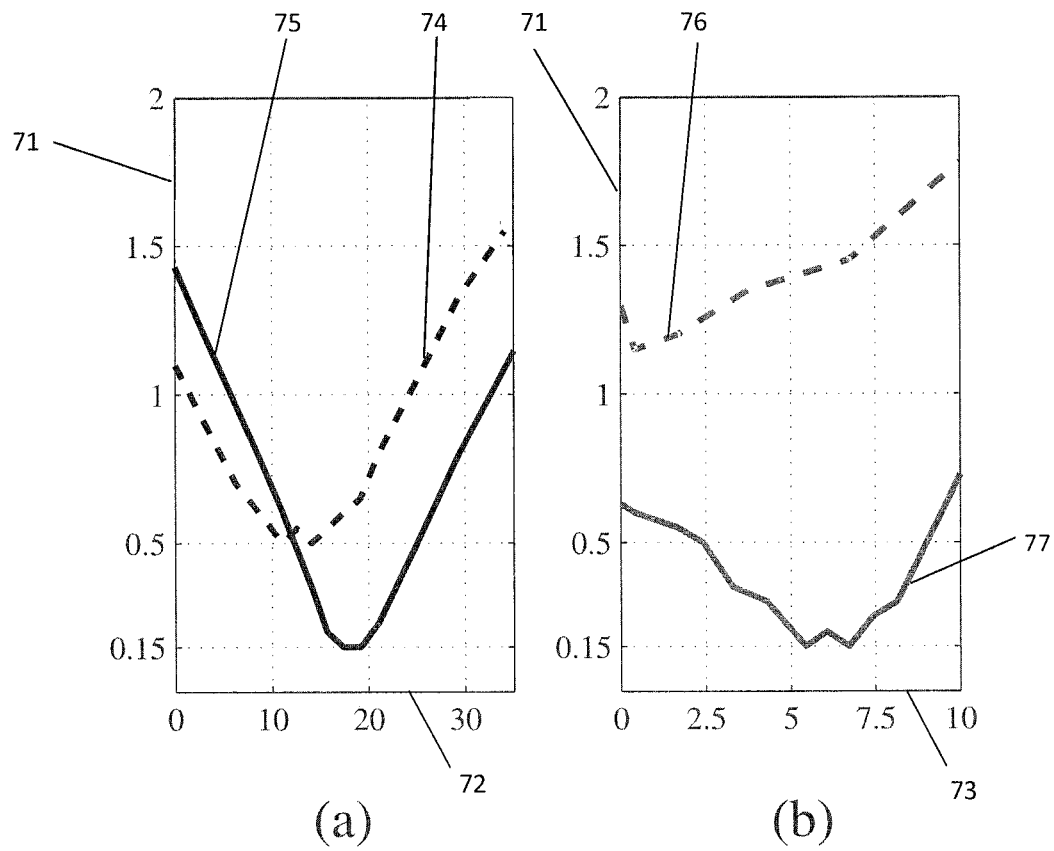
FIG. 15 shows the measured PDL at λ=1556 nm as a function of waveguide and ring heater powers, as can be obtained in a system as shown in FIG. 10.

To reduce fiber-misalignment induced PDL, the fibers were first aligned to a reference waveguide with 1-dimensional grating couplers. The high polarization dependence of these couplers was used to adjust the input polarization to the $P_{2,in}$ state, indicated as polarization 21, using a polarization controller. The fibers were then aligned for maximum transmission on the 2D gratings. While this provides symmetrical power coupling, it may still result in an unwanted phase shift between both arms 16 and 17, due to slight misalignment, since the fiber coupling efficiency is relatively position tolerant. Current was supplied independently to the π phase shifter 40 and the ring heaters. For PDL characterization a tunable laser source and the Fiberpro "PL 2000" PDL meter can be employed. For device characterization, the transmission spectrum of the preferred embodiment was first recorded (an example thereof being illustrated in FIG. 12) and subsequently PDL was measured as a function of heater power at the transmission peaks. The result is shown in FIG. 15 whereby FIG. 15(a) indicates the PDL 71 in dB with respect to the waveguide heating power 72 in mW whereby the dashed curve 74 represents the values with the ring heater switched off and the solid curve 75 represents the values with the ring heater turned on to a power of 6 mW. FIG. 15(b) indicates the PDL 71 in dB with respect to the ring heating power in mW whereby the dashed curve 76 represents the values with the waveguide heater switched off and the dashed curve 76 represents the values with the waveguide heater turned on to a power of 17.8 mW. Initially, the ring heater 51 is switched off, and the power supplied to the phase shift heater 40 is varied. At a wavelength of λ=1556 nm this yields the dashed curve 71 in FIG. 15(a). As expected, PDL decreases as the phase shift increases, reaching a minimum value of 0.5 dB at 14 mW of heating power. As more power is applied, the phase shift exceeds the optimum value so that PDL increases again. The fact that the device exhibits a higher PDL with 30 mW of power than without heating, can be attributed to imperfect fabrication or slight fiber misalignment that yield an initial non-zero phase shift between the arms. When power was supplied only to the ring heater 51 (with the phase shift heater switched off), only negligible PDL improvements were observed as shown by the dashed curve 76 in FIG. 15(b). This indicates that the rings were almost matched. However, heating the polarization diversity circuit waveguide arm can induce different thermal crosstalk in the rings, so that they have to matched again using the ring heaters. This can be seen in the solid curve 77 in FIG. 15(b), where the phase shift heater 40 is fixed at 17.8 mW and PDL reaches a minimum of 0.15 dB at 6 mW ring heater power. Conversely, as shown in the solid curve 75 in FIG. 15(a), at this power level for the ring heater the minimum PDL is achieved at 17.8 mW phase shift heating power. The fact that the phase shift heating powers that yield minimum PDL are slightly different depending on the power supplied to the ring heaters, can again be explained by thermal crosstalk from the ring heaters to the polarization diversity waveguide arm. The optimum phase shift and ring heater power levels are found to be generally slightly different for different transmission peaks. However, choosing adequate levels, it is possible to achieve low PDL at several consecutive peaks, inside the 1 dB fiber to fiber coupling bandwidth. This is shown in table I, that describes the measured PDL at transmission peaks with heaters on and off with a phase shift heater power of ~20 mW and a ring heater power of ~4 mW with the first row representing the wavelength in mm, the second row the PDL in dB with heaters on and the third row the PDL in dB with heaters of. From the table it is clear that PDL well below 0.5 dB for the downstream wavelength as well as continuous wave located at the next peak is readily achieved at $\lambda$=1551.5 nm and $\lambda$=1556 nm. Also notice PDL improvements of up to 1.4 dB (at $\lambda$=1560.5 nm) are achieved when the heaters are used. By readjusting the heaters, low PDL can be obtained in a different wavelength range.

In one aspect the present invention also relates to a method for coupling radiation with low, reduced or no polarization dependent loss. The method comprises receiving radiation on a first two-dimensional grating, splitting said received radiation into two distinct waveguide arms and recombining the radiation from the waveguide arms in the second grating coupler for coupling the radiation out, the method comprising inducing an additional phase shift in at least one of the two distinct waveguide arms thereby inducing a relative phase shift of $\pi$ between the two distinct waveguide arms so as to provide a TE/TM polarization switch for radiation between the first grating coupler and the second grating coupler. Other features and method steps of embodiments according to the present invention can correspond with the functionality of features and components of the system as described in embodiments according to the first aspect.

Figure 13:
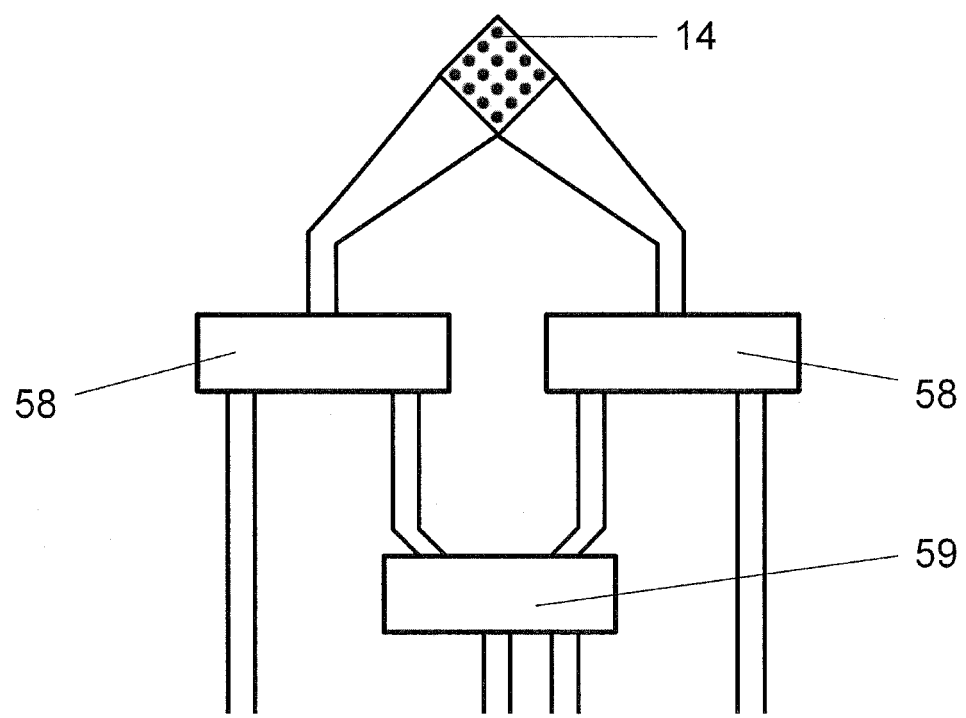
FIG. 13 shows a circuit of a 2D grating coupler in combination with power splitters and an interferometer, according to an embodiment of another aspect of the present invention. This is an integrated polarization detector and detects the polarization at the fiber facet. By detecting the power in both waveguide arms and the phase difference between the light in both arms, one can know the polarization of the incoming light.

According to another aspect of the present invention, systems and methods are provided for determining the polarization of light with an arbitrary polarization. According to embodiments of the present invention, the latter is performed by coupling the radiation into two waveguides by means of a 2-dimensional grating. The incoming polarization can be determined by the power ratio of the light coupled into the waveguides and the phase difference between the two. Knowing the power that is coupled to both arms and the phase difference, the polarization of the light at the fiber facet can be determined. An integrated circuit which is capable of measuring these quantities is shown in FIG. 13. A circuit of a 2D grating coupler 14 in combination with power splitters 58 and an interferometer 59 is shown. This is an integrated polarization detector and detects the polarization at the fiber facet. By detecting the power in both waveguide arms and the phase difference between the light in both arms, one can know the polarization of the incoming light.

Figure 14:
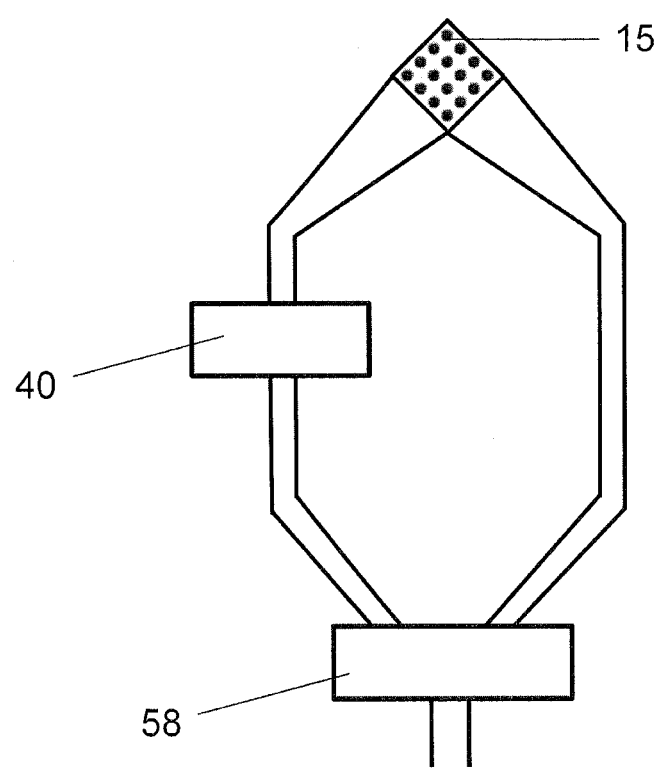
FIG. 14 shows a circuit of a 2D grating coupler in combination with a phase shifter and a variable power splitter, according to an embodiment of the present invention. This circuit can be used to control the polarization coupled out of the 2D grating. Vice versa this can be used to couple in and then combine the orthogonal polarizations of an arbitrary polarization.

The present invention also relates to embodiments wherein methods and systems are provided for control of polarization coupled into an optical fiber. In embodiments according to the present invention, photonic integrated circuits are provided, wherein the polarization coupled into the optical fiber can be controlled by controlling the power ratio of the light in the two waveguides by means of a variable power splitter, for example a Mach Zehnder Interferometer with a phase shifter, and by controlling the phase difference between the guided light in the two waveguides by means of a phase shifter. Such a circuit is shown in FIG. 14. A circuit of a 2D grating coupler 15 in combination with a phase shifter 40 and a variable power splitter 58 is shown. This circuit can be used to control the polarization coupled out of the 2D grating. Vice versa this can be used to couple in and then combine the orthogonal polarizations of an arbitrary polarization.

It is an advantage of at least some embodiments of the present invention that by using a $\pi$ phase shift in one of the arms of a polarization diversity circuit the PDL induced by the near vertical grating couplers can be reduced from more than 1 dB to only 0.15 dB, at a fixed wavelength. It thereby is an advantage that besides compensation for the inherent PDL induced by the two-dimensional gratings, also compensation for PDL induced by misalignment of the input and output fibers and exact matching of the devices in each arm can be obtained.

Furthermore, according to at least some embodiments of the present invention, a wavelength router was obtained wherein it was possible to achieve PDL below 0.5 dB at several consecutive transmission peaks.

Embodiments of the present invention can enable low PDL operation in a variety of polarization diversity configurations, as illustrated above.

It is an advantage of embodiments of the present invention that the integrated photonic circuit based on two-dimensional in and outcoupling gratings and a phase shifting means can act as a photonics integrated $\lambda/2$ plate.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

TABLE 1

| WL (mm) | 1542.5 | 1547.0 | 1551.5 | 1556.0 | 1560.5 | 1565.0 |
|---|---|---|---|---|---|---|
| PDL (dB) ON | 0.8 | 0.4 | 0.4 | 0.35 | 0.6 | 1 |
| PDL (dB) OFF | 1.25 | 1.1 | 1.2 | 1.4 | 2.0 | 2.2 |

The invention claimed is:
1. A photonics integrated circuit for processing radiation, the photonics integrated circuit comprising:
   a first two-dimensional grating coupler coupling in radiation:
   a second two-dimensional grating coupler coupling out radiation;
   a waveguide structure comprising two distinct waveguide arms splitting radiation received from the first grating coupler and recombining radiation in the second grating coupler;
   a phase shifting means inducing an additional phase shift in at least one of the two distinct waveguide arms thereby inducing a relative phase shift of $\pi$ between the two distinct waveguide arms so as to provide a TE/TM polarization switch for radiation at the second grating coupler with respect to the first grating coupler.
2. The photonics integrated circuit according to claim 1, wherein the two-dimensional grating coupler is arranged to couple at least part of the radiation of both TE and TM polarization into each of the waveguide arms.

3. The photonics integrated circuit according to claim 1, wherein the phase shifting means is a phase shifting means introduced in one of the two distinct waveguide arms, the phase shifting means inducing a phase shift π.

4. The photonics integrated circuit according to claim 1, wherein the phase shifting means is any or a combination of an integrated heater, an electro-optical device or an added fixed waveguide portion.

5. The photonics integrated circuit according to claim 1 wherein the first grating coupler couples radiation from an optical fiber to the waveguide structure.

6. The photonics integrated circuit according to claim 1, wherein the second grating coupler couples between the waveguide structure and an optical fiber.

7. The photonics integrated circuit according to claim 1, wherein the first grating coupler and the second grating coupler are substantially equal.

8. The photonics integrated circuit according to claim 1, wherein the optical circuit comprises a silicon on insulator material.

9. The photonics integrated circuit according to claim 1, the photonics integrated circuit comprising an attenuator in at least one of the waveguide arms.

10. The photonics integrated circuit according to claim 1, the optical circuit comprising a demultiplexer for splitting the radiation in at least one waveguide arm into different wavelength beams.

11. The photonics integrated circuit according to claim 10, wherein the phase shifting means is positioned downstream of the demultiplexer.

12. The photonics integrated circuit according to claim 1 wherein at least one of the two-dimensional grating couplers couples radiation between the waveguide structure and free space.

13. A method for coupling radiation, the method comprising the steps:
  receiving radiation on a first two-dimensional grating,
  splitting said received radiation into two distinct waveguide arms,
  recombining the radiation from the waveguide arms in the second grating coupler for coupling the radiation out, and
  inducing an additional phase shift in at least one of the two distinct waveguide arms thereby inducing a relative phase shift of π between the two distinct waveguide arms so as to provide a TE/TM polarization switch for radiation at the second grating coupler with respect to the first grating coupler.

* * * * *